United States Patent [19]

Sack

[11] Patent Number: 4,599,319

[45] Date of Patent: Jul. 8, 1986

[54] PBO-FREE GLASSES FOR CATHODE RAY TUBES HAVING A HIGH PROTECTIVE EFFECT AGAINST X-RAYS WHILE SIMULTANEOUSLY HAVING GOOD RESISTANCE TO ACID AND STABILITY TO RADIATION

[75] Inventor: Werner Sack, Mainz, Fed. Rep. of Germany

[73] Assignee: Schott-Glasswerke, Mainz, Fed. Rep. of Germany

[21] Appl. No.: 629,729

[22] Filed: Jul. 6, 1984

[30] Foreign Application Priority Data

Dec. 4, 1982 [DE] Fed. Rep. of Germany ....... 3244970

[51] Int. Cl.$^4$ .............................................. C03C 3/04
[52] U.S. Cl. ...................................... 501/57; 501/64; 501/69; 501/72; 313/480; 252/478
[58] Field of Search ....................... 501/57, 64, 72, 69; 313/480; 252/478

[56] References Cited

U.S. PATENT DOCUMENTS

| | | | |
|---|---|---|---|
| 3,464,932 | 9/1969 | Connelly et al. | 501/57 |
| 3,819,972 | 6/1974 | Sanner | 501/57 |
| 4,015,966 | 4/1977 | Weaver | 501/64 |
| 4,277,286 | 7/1981 | Boyd et al. | 313/480 |
| 4,390,637 | 6/1983 | Daiku | 313/480 |

FOREIGN PATENT DOCUMENTS

| | | | |
|---|---|---|---|
| 50-40611 | 4/1975 | Japan | 501/57 |
| 113813 | 4/1978 | Japan | 501/64 |
| 154346 | 12/1980 | Japan | 501/64 |
| 58-84142 | 5/1983 | Japan | 501/64 |
| 120536 | 7/1983 | Japan | 501/64 |

*Primary Examiner*—William R. Dixon, Jr.
*Assistant Examiner*—Ann Knab
*Attorney, Agent, or Firm*—Haight & Associates

[57] ABSTRACT

New, PbO-free glasses for cathode ray tubes are composed of (in % by weight) 50–52 $SiO_2$; 0–3 $Al_2O_3$; 1–1.7 $Li_2O$; 6.5–10.7 $Na_2O$; 0–4.5 $K_2O$; 0.4–1.4 F; 0–0.5 $TiO_2$; 0.2–1.2 $CeO_2$; 0–5 ZnO; 0–7.0 BaO; 15–22 SrO; and 6.3–10.3 $ZrO_2$, and are characterized by a high protective effect against X-rays while having at the same time good resistance to acid and stability to radiation.

3 Claims, No Drawings

PBO-FREE GLASSES FOR CATHODE RAY TUBES HAVING A HIGH PROTECTIVE EFFECT AGAINST X-RAYS WHILE SIMULTANEOUSLY HAVING GOOD RESISTANCE TO ACID AND STABILITY TO RADIATION

DESCRIPTION

1. Technological Field

The invention relates to PbO-free glasses for cathode ray tubes having a high protective effect against X-rays while simultaneously having good resistance to acid and stability to radiation.

2. Background of the Invention

Compositions of glasses which are stable to radiation used for the manufacture of cathode ray tubes have been known from DE-OS No. 31 03 345 (U.S. Pat. No. 4,277,286). For these glasses, the X-ray absorption coefficient $\mu$ for 0.6 Å lies near values of 34.8 to 51.8 cm$^{-1}$ (see page 15), for which the following components are predominately responsible:

SrO: from 2-14% by weight,
BaO: from 10-20% by weight,
ZrO$_2$: from 2-8% by weight,
ZnO: from 5-12% by weight.

Stability against UV, electron and X-rays (e- and $\gamma$-rays) is achieved by the lack of any components which are easily reducible, such as PbO and As$_2$O$_3$, and by the introduction of familiar stabilizing additives, such as 0.3-1.0% by weight of CeO$_2$ (specifically to prevent any browning or tinting caused by X-rays), and 0.5-1.0% by weight of TiO$_2$ (specifically to prevent solarization, i.e. any color change caused by UV rays).

The glasses described in DE-OS No. 31 03 345 have preferably been used for the production of TV tubes and/or television sets with large-area screens (picture tube of large volume) or also for smaller television projection tubes with high operating voltages of up to ~40 KV with the image being projected onto a wall.

During the process of manufacturing picture tubes, the glass parts must be subjected to an acid washing process with diluted HF and/or with solutions of NH$_4$HF$_2$ of different concentrations. During this process, there must be no noticeable deterioration, for example by the development of corrosive structures. The same applies to the recycling process for glass parts of defective picture tubes.

In addition to the obligatory high protective effect against X-rays, a high resistance to discoloration caused by UV-, e- and $\gamma$-rays, the glasses therefore must exhibit an adequate resistance to acid, at the same time.

Practice has shown that an adequate resistance to acid is given for customary TV glasses, in general, and for the glasses with a high protective effect against X-rays being considered here, in particular, if a value of 100 mg/dm$^2$ as provided by DIN 12116 is not exceeded. Compared to familiar laboratory glasses, this acid value is poor; however, for picture tube glasses weight losses of $\leq$100 mg/dm$^2$ resulting from acid corrosion, as specified in DIN 12116, have proved adequate.

For normal TV screen glasses (for black and white and color), the $\mu$-values for 0.6 Å lie generally between 20 and 28×cm$^{-1}$. The values are achieved in glasses which contain about 20% by weight of BaO, SrO, ZrO$_2$, ZnO and PbO, which meet the requirement for acid resistance without any difficulty. For television sets or picture tubes with a markedly higher protective effect of $\mu$>40×cm$^{-1}$ (for 0.6 Å) there is a problem in meeting the adequate resistance to acid because the concentration of the above-named components (which in practice cause exclusively the absorption of X-rays in the glass) has to be raised to values considerably higher than 20% which generally causes the resistance to acid to decrease.

The familiar glasses of DE-OS No. 31 03 345 do not meet the requirement of adequate resistance to acid, as is demonstrated in comparative tests; for this purpose, Examples No. 3, 5, 11, 13 and 14 were remelted in a platinum crucible with a volume of 1 liter, at a temperature of between 1450°/1400° C. for a period of 2.5 hours; then they were stirred with a Pt-stirrer and homogenized until a temperature of ~1200° C. was reached; subsequently the mass was left to stand for 45 minutes, then it was poured into a NCT 3-steel mold at 1380° C., and was cooled in a cooling furnace from 520° C. down to ambient temperature at a rate of 20° C./h. The cooled castings were used to determine acid resistance according to DIN 12116 and water resistance according to DIN 12111. The test results have been summarized in Table 1:

TABLE 1

| Components/Properties | 3 | 5 | 11 | 13 | 14 |
|---|---|---|---|---|---|
| SiO$_2$ | 49.64 | 50.41 | 47.94 | 45.82 | 51.50 |
| Al$_2$O$_3$ | 1.70 | 1.70 | 1.36 | 1.34 | 1.41 |
| ZrO$_2$ | 3.00 | 3.00 | 3.28 | 3.24 | 3.41 |
| ZnO | 10.60 | 7.60 | 9.75 | 9.64 | 10.14 |
| CaO | 1.80 | 1.80 | — | — | — |
| SrO | 3.40 | 6.40 | 6.90 | 9.55 | 10.04 |
| BaO | 14.90 | 14.90 | 18.39 | 18.17 | 10.62 |
| Li$_2$O | 1.50 | 1.50 | 1.19 | 1.18 | 1.24 |
| Na$_2$O | 6.50 | 5.70 | 5.78 | 5.71 | 6.01 |
| K$_2$O | 5.10 | 5.10 | 7.22 | 7.16 | 7.35 |
| TiO$_2$ | 0.80 | 0.80 | — | — | — |
| CeO$_2$ | 0.66 | 0.66 | — | — | — |
| Sb$_2$O$_3$ | 0.40 | 0.40 | 0.39 | 0.39 | 0.41 |
| B$_2$O$_3$ | — | — | — | — | — |
| Total, in percent | 100.00 | 99.97 | 102.20 | 102.20 | 102.13 |
| Density (g/cc) | 3.080 | 3.083 | 3.184 | 3.237 | 3.063 |
| $\mu$ at 0.6 Å in cm$^{-1}$ | 38.3 | 40.6 | 47.0 | 51.8 | 45.2 |
| Acid Resistance acc. to DIN 12116 | ~1570 | ~810 | ~16000 | ~18000 | ~1280 |

TABLE 1-continued

| Components/Properties | 3 | 5 | 11 | 13 | 14 |
|---|---|---|---|---|---|
| Water Resistance acc. to DIN 12111 | 44 | 54 | 54 | 56 | 59 |
| $\alpha \times 10^7$ (20–300° C.) | 87.3 | 96.7 | 97.4 | 100.7 | 94.3 |
| Tg (°C.); $\eta \sim 10 \times 13.5$ p | 98 | 502 | 503 | 502 | 502 |

An object of the present invention is glasses for cathode ray tubes having a high protective effect against X-rays and good stability against rays which at the same time exhibit adequate resistance to acid.

DISCLOSURE OF THE INVENTION

This objective is met by glasses according to the patent claims. Surprisingly, it was found that glasses can be molten by using the components of BaO, ZnO, $ZrO_2$ and SrO, which are effective for obtaining X-ray absorption and good ray stability,—the same components as used in glasses according to DE-OS No. 31 03 345, but in different ranges of concentrations, which glasses *simultaneously* meet the requirements of protection from rays, stability to radiation, and resistance to acid.

In the glasses of the invention the components which are decisive for the stability to radiation are present in the following ranges:

SrO: from 15.0–22.0% by weight,
BaO: from 0–7.0% by weight,
$ZrO_2$: from 6.3–10.3% by weight,
ZnO: from 0–5.0% by weight,
SrO+BaO+$ZrO_2$+ZnO: from 32.0–36.5% by weight.

For acid resistance according to DIN 12116, the glasses suffer a loss in weight of 18.3–82 mg/dm$^2$ and are therefore far superior to all similar glasses which have become known until now. Due to the overall-moderate resistance of the glasses to acid, the homogeneity (streaking) of the molten glass naturally exerts a great influence on the acid resistance determination according to DIN 12116 so that varying values might be obtained in parallel determinations. Examples have been listed for glasses 5 and 13 in Table 4.

In determining water resistance according to DIN 12111, the values of 47–350 µg $Na_2O$/g granular material (hydrolytic class 2 to 4) are achieved; and in the determination of resistance to alkaline solutions according to DIN 52322, the glasses rich in $ZrO_2$ even fall into the 1st alkaline class.

The superiority of the glasses of the present invention becomes even clearer if the resulting, very high values for X-ray absorption, µ, are also taken into consideration. The µ-value of 0.6 Å lies between 53.5–63×cm$^{-1}$ for these glasses. Since the product of glass thickness and absorption coefficient µ is responsible for the overall absorption of X-rays, the consequence is, for example, that the screen of a projection tube which can be subjected to high stress loads, can be pressed with thinner wall sections than would be possible with a less well absorbing glass, whereby a higher thermal load capacity can be achieved in a favorable manner during operation and thus, a certain counteraction of the negative influence resulting from the relatively high E-moduli on the mechanical stability of these glasses.

The UV-stability of the glasses (solarization stability) corresponds to the values according to the state of the art. To test them, polished glass samples of 5 mm thickness are placed at a distance of 7 cm and are exposed to irradiation for 24 hours with a Hg-high-pressure lamp whose radiation maximum is 365 nm and which has a further band at 254 nm. The transmission reduction from irradiated to non-radiated sample is a measure of UV- or solarization stability. The critical wave length range for glasses of the invention lies between 360 and 420 nm, and in this wave length range, which is not visible to the human eye, the reduction amounts to between 20–2%. By adding $TiO_2$ (up to ~1% by weight), UV-stability can be increased. In the simultaneous presence of $CeO_2$ (up to ~2% by weight) as the most effective means for preventing discoloration due to X-rays, the maximum introduction of $TiO_2$ is however prohibited to avoid the occurrence of a marked lemon yellow hue. This reduces the overall transmission of the glasses and, for example, it may make it impossible to achieve an intended tinting with CoO and NiO (predetermined color coordinates x, y, in the hue triangle according to the standard color chart DIN 5033). Yet, the addition of $CeO_2$ is absolutely necessary for such glasses which are suitable for high operating voltages because it can markedly reduce—as was explained above—the discoloration of the secondary X-ray radiation triggered by the electrons. Depending on the operating conditions for these cathode ray tubes, one will strive for a compromise regarding the addition of $TiO_2$ and 0.65–0.80% by weight of $CeO_2$.

To examine the e- and γ-browning stability, the glasses of the invention were subjected to irradiation with the electronic gun with 0.14 Å sec/cm$^2$ with an acceleration voltage of 50 KV (corresponds to a radiation dosage of 20.6 r), and then the transmission was measured from 300–600 nm; thickness of the polished test samples was 5 mm. The reduction in transmission (τ) as compared to the non-radiated sample is a measure for the discoloration caused by e- and γ-browning. If the radiated sample is then heated to 400° C. at 20° C./h and is maintained at that temperature for 4 hours, the γ-browning disappears whereas the e-browning remains.

By re-measuring the transmission of the cooled sample which had been heated, the difference between the second and the previous measurements yields the component of irreversible discoloration due to e-browning, and the reversible γ-component. Table 2 lists these values for four examples with compositions according to the invention (Examples 9, 11, 4 and 7).

The degree of discoloration caused by e- and γ-browning is influenced by the operating conditions of the cathode ray tube, by the sum of alkali materials, by the ratio of $Na_2O/K_2O$ and by the $CeO_2$ concentration. Pure, $Na_2O$-rich glasses have the highest tendency towards discoloration, even with UV-rays.

TABLE 2

TRANSMISSION REDUCTION μ CAUSED BY ε-AND γ-BROWNING DURING ELECTRON GUN RADIATION (50 KV, 0.14 A · sec/cm²) AND SUBSEQUENT 4 H HEATING AT 400° C. (e).

| Type of radiation | Wave Length (nm) | τ-Reduction in % for Example No. | | | |
|---|---|---|---|---|---|
| | | 9 | 11 | 4 | 7 |
| ε + γ | 400 | 13.0 | 7.5 | 5.8 | 1 |
| | 450 | 8.7 | 3.7 | 2.0 | 0 |
| | 520 | 6.3 | 2.3 | 1.0 | 0 |
| | 600 | 6.8 | 3.0 | 1.0 | 0 |
| ε | 400 | 1.5 | 0 | 1.5 | 0 |
| | 450 | 0.7 | 0 | 0.6 | 0 |
| | 520 | 0.3 | 0 | 0.5 | 0 |
| γ | 600 | 0.3 | 0 | 0.7 | 0 |
| | 400 | 11.5 | 7.5 | 4.3 | 1 |
| | 450 | 8.0 | 3.7 | 1.4 | 0 |
| | 520 | 6.0 | 2.3 | 0.5 | 0 |
| | 600 | 6.5 | 3.0 | 0.3 | 0 |

Table 3 summarizes examples of glasses with compositions in the range specified in the invention, in percent by weight. Table 4 contains the most important properties of the glasses in Table 3. Example 1 in Table 3 describes a glass which lies outside the area for which claims have been made; it is to show how critical the selected ranges of composition are.

TABLE 3

EXAMPLES OF COMPOSITIONS IN % BY WEIGHT

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 52.00 | 52.00 | 51.80 | 51.00 | 52.20 | 50.80 | 50.00 | 50.00 | 50.00 | 50.00 | 50.00 | 50.00 | 50.00 | 50.00 |
| $Al_2O_3$ | 1.40 | 1.40 | 0.80 | 1.00 | 1.60 | 0.60 | 0.60 | 3.00 | 1.00 | 0.50 | -.- | 0.40 | 0.60 | 0.60 |
| $Li_2O$ | 1.00 | 1.00 | 1.50 | 1.70 | 1.70 | 1.70 | 1.70 | 1.00 | 1.00 | 1.40 | 1.70 | 1.70 | 1.70 | 1.70 |
| $Na_2O$ | 18.00 | 18.00 | 7.70 | 8.00 | 8.50 | 8.90 | 6.50 | 18.40 | 18.70 | 9.00 | 18.00 | 8.90 | 8.70 | 8.50 |
| $K_2O$ | -.- | -.- | 1.70 | 1.80 | 2.50 | 2.50 | 4.50 | -.- | -.- | -.- | -.- | 2.50 | 2.50 | 2.00 |
| ZnO | 7.30 | 5.00 | 1.00 | -.- | -.- | -.- | -.- | 3.50 | 2.00 | 4.50 | -.- | -.- | -.- | 1.30 |
| BaO | 5.50 | 5.50 | 6.00 | 5.70 | 2.70 | 2.70 | 3.20 | 6.00 | 6.20 | -.- | 4.20 | 2.70 | 2.70 | 7.00 |
| SrO | 18.00 | 18.00 | 21.70 | 22.00 | 22.00 | 22.00 | 21.70 | 15.00 | 18.00 | 21.70 | 21.70 | 22.00 | 22.00 | 17.40 |
| $ZrO_2$ | 4.00 | 6.30 | 6.30 | 7.30 | 7.30 | 9.30 | 10.30 | 10.30 | 10.30 | 10.30 | 10.30 | 10.30 | 10.30 | 18.00 |
| F | 0.40 | 0.40 | 0.80 | 0.80 | 0.80 | 0.80 | 0.80 | 0.40 | 0.40 | 1.40 | 1.40 | 0.80 | 0.80 | 0.80 |
| $TiO_2$ | -.- | -.- | -.- | -.- | -.- | -.- | -.- | -.- | -.- | -.- | 0.50 | -.- | -.- | -.- |
| $CeO_2$ | 0.20 | 0.20 | 0.70 | 0.70 | 0.70 | 0.70 | 0.70 | 0.20 | 0.40 | 1.20 | 0.20 | 0.70 | 0.70 | 0.70 |
| $Sb_2O_3$ | 0.50 | 0.50 | 0.30 | 0.30 | 0.30 | 0.30 | 0.30 | 0.50 | 0.30 | 0.30 | 0.30 | 0.30 | 0.30 | 0.30 |
| TOTALS | 100.30 | 100.30 | 100.30 | 100.30 | 100.30 | 100.30 | 100.30 | 100.30 | 100.30 | 100.30 | 100.30 | 100.30 | 100.30 | 100.30 |

TABLE 4

PROPERTIES OF GLASSES ACCORDING TO TABLE 3

| Properties | 1 | 2 | 3 | 4 | 5 | 6 | 7 |
|---|---|---|---|---|---|---|---|
| $\alpha \times 10^7$ (20–300° C.) | 96. | 94.9 | 99.0 | 101.3 | 101.4 | 103.8 | 96.6 |
| Tg (°C.); $\eta = 10^{13.5}$ Poise | 511. | 518. | 502. | 507. | 504. | 513. | 528. |
| Ew (°C.); $\eta = 10^{7.6}$ Poise | — | — | 684. | 684. | 683. | 691. | 716. |
| $V_A$ (°C.); $\eta = 10^4$ Poise | 933. | 958. | 947. | 937. | 953. | 954. | 991. |
| Density (g/cc) | 3.065 | 3.072 | 3.094 | 3.09 | 3.024 | 3.065 | 3.084 |
| $T_{K100}$ (°C.); $\rho = 10^8\ \Omega \cdot cm$ | — | — | 337. | 336. | 313. | — | 359. |
| E-Modulus (N/mm²) | — | — | $84.0 \times 10^3$ | $84.7 \times 10^3$ | $84.7 \times 10^3$ | — | $86.8 \times 10^3$ |
| Acid resistance DIN 12116 | 380 | 33 | 81 | 82 | 37/21 | 16 | 27 |
| Water resistance DIN 12111 | 67 | 64 | 158 | 350 | 258 | 346 | 170 |
| Alkali resistance DIN 52322 | | | 43 | | | | 32 |
| X-ray absorption μ (cm) for 0.6 A° | 51.77 | 53.54 | 57.21 | 58.12 | 54.93 | 58.81 | 61.17 |
| Devitrification props. at falling temps. from 1320 − 550° C. | — | — | >550° C. no devit. | >550° C. no devit. | >550° C. no devit. | >550° C. no devit. | |

| Properties | 8 | 9 | 10 | 11 | 12 | 13 | 14 |
|---|---|---|---|---|---|---|---|
| $\alpha \times 10^7$ (20–300° C) | 92. | 96.7 | 93.3 | 102.3 | 102.4 | 101.8 | 98.6 |
| Tg (°C.); $\eta = 10^{13.5}$ Poise | 536. | 530. | 512. | 506. | 515. | 516. | 508. |
| Ew (°C.); $\eta = 10^{7.6}$ Poise | — | — | — | — | 695. | — | 693. |
| $V_A$ (°C.); $\eta = 10^4$ Poise | — | 975. | 954. | 926. | 952. | 963. | 952. |
| Density (g/cc) | 3.088 | 3.121 | 3.133 | 3.116 | 3.089 | 3.092 | 3.114 |

TABLE 4-continued

| PROPERTIES OF GLASSES ACCORDING TO TABLE 3 | | | | | | | |
|---|---|---|---|---|---|---|---|
| $T_{K100}$ (°C.); $\rho = 10^8 \Omega \cdot cm$ | — | — | — | 296. | 320. | 317. | 320. |
| E-Modulus (N/mm$^2$) | — | — | — | — | — | $87.0 \times 10^3$ | — |
| Acid resistance DIN 12116 | 19 | 25 | 23 | 63 | 66 | 44/26 | 18.3 |
| Water resistance DIN 12111 | 54 | 88 | 49 | 388 | 277 | 209 | 95 |
| Alkali resistance DIN 52322 | | | | | | | |
| X-ray absorption $\mu$ (cm) for 0.6 A° | 54.46 | 58.65 | 63.08 | 61.45 | 60.85 | 60.91 | 57.64 |
| Devitrification props. at falling temps. from 1320 − 550° C. | | | | | | >500° C. no devit. | >500° C. no devit. |

Melting temp. in pt-crucible: 1320° C.; Melting time: 30 min.; Tempering time: 60 min.

I claim:

1. PbO-free glasses for cathode ray tubes having a high protective effect against X-rays while having at the same time good resistance to acid and stability to radiation, with a heat expansion coefficient in the temperature range of 20°–300° C. from 92° to 103.8·10$^{-7}$/°C., characterized by the fact that their x-ray absorption coefficient $\mu$, for 0.6 Å, lie between 53.5 and 63.1·cm$^{-1}$, their resistance to acid is $\leq 100$ mg/dm$^2$, that they have transformation temperatures (Tg) of from 502° to 536° C., softening temperatures (Ew) of from 683° to 716° C., processing temperatures (V$_A$) of from 926°–991° C., densities (D) of from 3.024–3.133 g/cc and $T_{K100}$ values of 296°–359° C., and that they contain in the starting mixture, calculated in % by weight of oxide, a composition consisting essentially of:

SiO$_2$: 50.0 to 52.2% by weight
Al$_2$O$_3$: 0.0 to 3.0% by weight
Li$_2$O: 1.0 to 1.7% by weight
Na$_2$O: 6.5 to 10.7% by weight
K$_2$O: 0.0 to 4.5% by weight
Li$_2$O+Na$_2$O+K$_2$O: 10.4 to 13.1% by weight
F: 0.4 to 1.4% by weight
TiO$_2$: 0.0 to 0.5% by weight
CeO$_2$: 0.2 to 1.2% by weight
ZnO: 0.0 to 5.0% by weight
BaO: 0.0 to 7.0% by weight
SrO: 15.0 to 22.0% by weight
ZrO$_2$: 6.3 to 10.3% by weight
ZnO+BaO+SrO+ZrO$_2$: 32.0 to 36.5% by weight
Sb$_2$O$_3$: 0.3 to 0.5% by weight.

2. Glass as in claim 1, characterized by the fact that it contains in the starting mixture, calculated in % by weight of oxide:

SiO$_2$: 50.00% by weight
Al$_2$O$_3$: 0.60% by weight
Li$_2$O: 1.70% by weight
Na$_2$O: 8.50% by weight
K$_2$O: 2.00% by weight
BaO: 7.00% by weight
SrO: 17.40% by weight
ZrO$_2$: 10.00% by weight
F: 0.80% by weight
CeO$_2$: 0.70% by weight
Sb203: 0.30% by weight
ZnO: 1.30% by weight.

3. Glass as in claim 1, characterized by the fact that it contains in the starting mixture, calculated as % by weight of oxide:

SiO$_2$: 50.00% by weight
Al$_2$O$_3$: 0.60% by weight
Li$_2$O: 1.70% by weight
Na$_2$O: 8.70% by weight
K$_2$O: 2.50% by weight
BaO: 2.70% by weight
SrO: 22.00% by weight
ZrO$_2$: 10.30% by weight
F: 0.80% by weight
CeO$_2$: 0.70% by weight
Sb$_2$O$_3$: 0.30% by weight.

* * * * *